(12) United States Patent
Bell et al.

(10) Patent No.: US 6,679,446 B2
(45) Date of Patent: Jan. 20, 2004

(54) SEAT BELT PRETENSIONER

(75) Inventors: John Bell, Carlisle (GB); Martyn Palliser, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/321,527

(22) Filed: Dec. 18, 2002

(65) Prior Publication Data

US 2003/0230661 A1 Dec. 18, 2003

(30) Foreign Application Priority Data

Jun. 14, 2002 (EP) .......................................... 02254172

(51) Int. Cl.[7] .............................................. B60R 22/46
(52) U.S. Cl. ..................................................... 242/374
(58) Field of Search .......................... 242/374; 280/806; 297/478

(56) References Cited

U.S. PATENT DOCUMENTS

| | | | | |
|---|---|---|---|---|
| 5,697,571 A | * | 12/1997 | Dybro et al. ............... | 242/374 |
| 5,782,423 A | | 7/1998 | Miller, III et al. .......... | 242/374 |
| 5,853,135 A | * | 12/1998 | Dybro et al. ............... | 242/374 |
| 5,899,399 A | * | 5/1999 | Brown et al. .............. | 242/374 |
| 6,250,720 B1 | | 6/2001 | Wier ........................... | 297/468 |
| 6,460,794 B1 | * | 10/2002 | Stevens ....................... | 242/374 |

FOREIGN PATENT DOCUMENTS

DE          2304878          8/1974

* cited by examiner

*Primary Examiner*—John M. Jillions
(74) *Attorney, Agent, or Firm*—Lonnie Drayer

(57) ABSTRACT

A seat belt pretensioner has a piston; a tube housing the piston; a force reservoir, activatable when a crash is sensed, to drive the piston along the tube; a resilient steel band connected to the piston; and means for selectively connecting the steel band to a retractor spool. Preferably the force reservoir is a gas generator which may be pyrotechnically activated and has an output in the tube on one side of the piston to drive the piston along the tube pulling the steel band and engaging the connecting means to turn the retractor spool and shorten the belt webbing. The steel band has indexing features, such as indexing holes or slots to engage teeth on the outer periphery of a drive wheel attached to the retractor spool. As the steel band is pulled by the piston it tightens around the drive wheel and the indexing holes engage the teeth, turning the drive wheel and thus the spool and pulling in the webbing to secure the vehicle occupant. The piston may have two piston members connected by a connecting assembly including a resilient member such as a coil spring.

20 Claims, 3 Drawing Sheets

SEAT BELT PRETENSIONER

FIELD OF THE INVENTION

The present invention relates to a seat belt pretensioner.

BACKGROUND OF THE INVENTION

Traditionally a seat belt safety restraint comprises a length of belt webbing connected at both ends to load bearing parts of a vehicle, and arranged to pass across a lap, and also diagonally across a torso, of a vehicle occupant. It is selectively fastened across the vehicle occupant by a buckle mechanism engaging a buckle tongue slidably attached to the webbing.

A retractor is fitted at one end of the webbing. To increase comfort for the vehicle occupant the webbing is allowed to pay out under relatively low loads to enable limited movement of the restrained vehicle occupant, for example to reach in-car entertainment controls or storage compartments. The retractor is biased to keep the webbing relatively taut about the vehicle occupant and a locking element is included to lock the retractor against webbing payout in the event of a crash. For example, an acceleration sensor may activate if the vehicle undergoes rapid acceleration or deceleration indicating a crash.

The retractor usually comprises a rotatable spool onto which the webbing is wound biased by a clock spring.

In recent years, pretensioners have been introduced to rapidly pull a length of webbing to actively tighten the seat belt about the vehicle occupant in the event of a crash condition being sensed. This takes up any slack that may have developed in the belt and helps to more correctly position the vehicle occupant in the seat to maximize the effect of the belt protection and of any secondary safety restraint such as an airbag.

Such known seat belt pretensioners are bulky, costly and comprise many parts. They are single operation devices that cannot operate a second time and may jam the retractor preventing webbing from being either extracted or retracted.

Seat belt pretensioners can be constructed according to the invention which have smaller package sizes and which function as or close to normal even after the pyrotechnic device has fired.

SUMMARY OF THE INVENTION

There is provided in accordance with the present invention a seat belt pretensioner comprising: a piston; a tube housing the piston; a force reservoir, activatable when a crash is sensed to drive the piston along the tube; a resilient steel band connected to the piston; and a means for selectively connecting the steel band to a retractor spool.

DETAILED DESCRIPTION OF THE INVENTION

Figure 1:
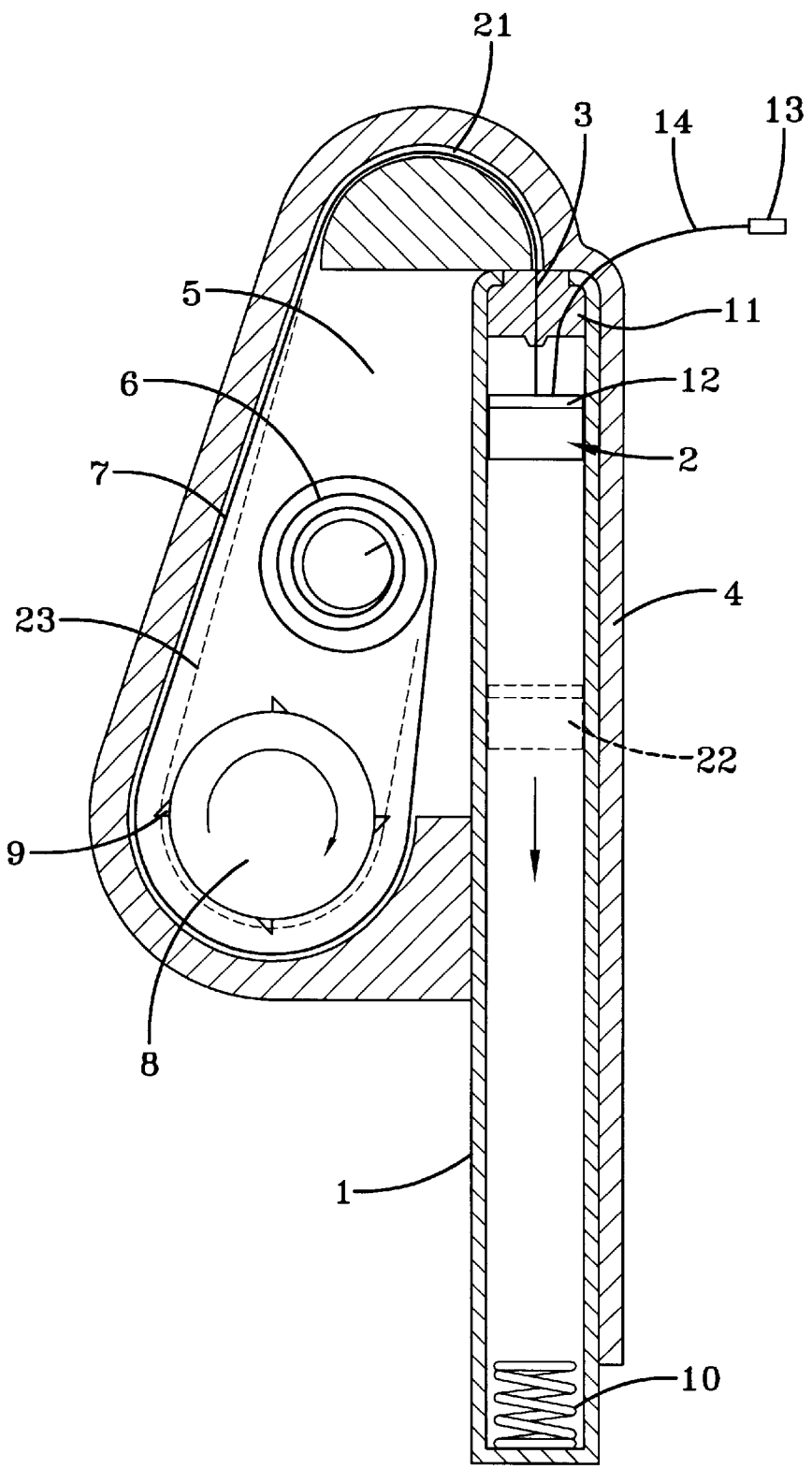
FIG. 1 is a schematic cross section of a seat belt pretensioner according to the present invention.

In FIG. 1 a seat belt pretensioner has a tube or cylinder 1 that is shown containing a piston 2 connected to a spring steel band 3. The pretensioner tube 1 may have a circular, square or any other cross-sectional shape and the piston 2 will have a complementary cross-section to fit snugly in the tube 1. The tube 1 may be straight as shown or have a circular or U shape as is convenient for the retractor package. The tube 1 is mounted to a housing 4, made for example of a plastic material, which has a broad hollow chamber 5 in which the steel band 3 is stored in a coil 6.

The steel band 3 normally extends from the piston adjacent an inside wall of the housing 4 as shown by the solid line 7, through a guide section 21 at the top and to the coil 6 around a drive wheel 8. The drive wheel 8 is connected to a retractor spool (not shown) and is free to rotate until the pretensioner is fired. The drive wheel 8 has outwardly pointing teeth 9.

A return spring 10 is located at one end of the tube 1 and a gas tight seal 11 is located at the other end of the tube. The return spring 10 may be located at or towards the end of the tube to push the piston 3 back at the end of the pretensioning stroke.

According to a preferred embodiment a force reservoir comprises a gas generator 12 which may be pyrotechnically activated. The gas generator has an output inside the tube 1 on one side of the piston 2 to drive the piston along the tube pulling the steel band 3, engaging the connecting means and turning the retractor spool to shorten the belt webbing. The piston 1 as shown has an integral gas generator 12 fired by a pyrotechnic initiator connected to a source of electricity 13 by wires 14. The gas generator may be separate with an output facing into the tube 1 on the side of the piston 2 connected to the band 3.

Figure 2:
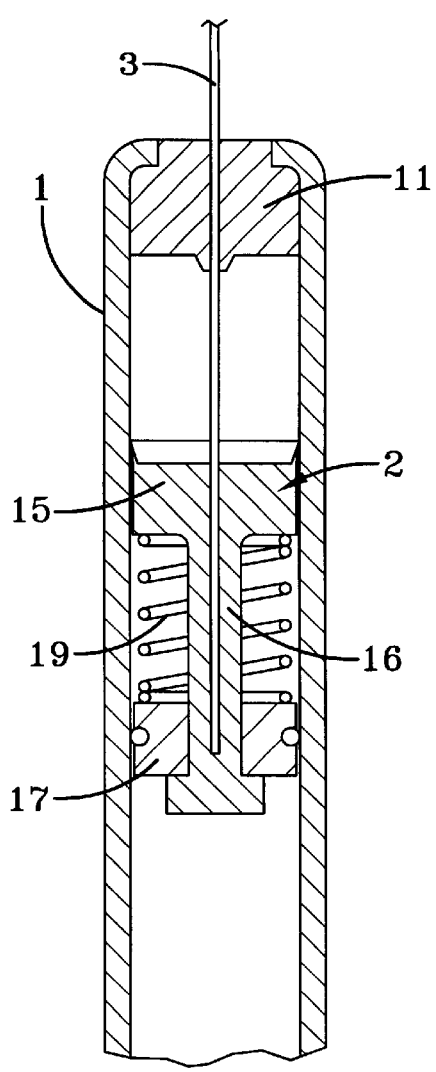
FIG. 2 is a cross section of part of the seat belt pretensioner of FIG. 1 before pretensioning.
Figure 3:
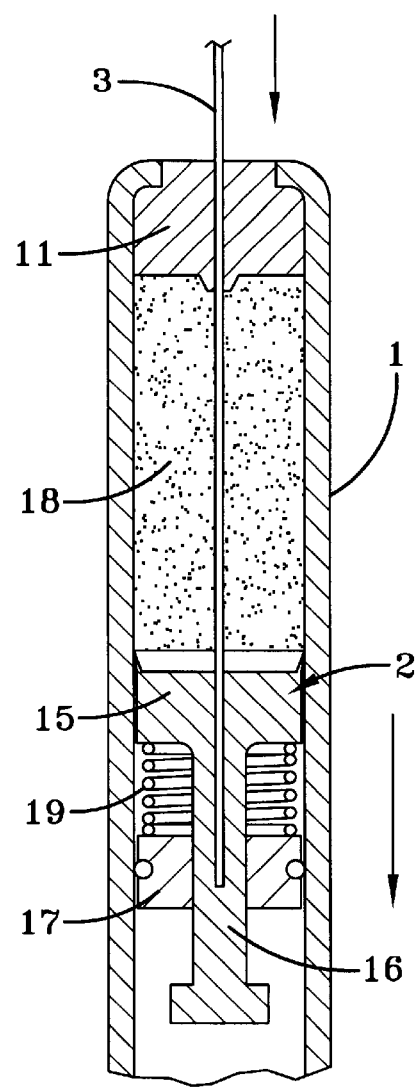
FIG. 3 is a cross section of part of the seat belt pretensioner of FIG. 1 immediately after pretensioning.

In FIGS. 2 and 3 the piston 2 is shown in more detail. An upper piston part 15 is connected to the steel band 3, for example by being molded around an end of the steel band. The upper piston part 15 has a narrow extension section 16 that passes through a hole in the middle of a lower piston part 17. A coil spring 19 fits around the extension section 16 and biases the upper and lower parts away from each other.

Advantageously the piston comprises two piston members 15, 17 connected by a connecting assembly including a resilient member such as a coil spring 19. The piston member 17 which is closest to the far end of the tube fits more snugly in the tube than the second piston member 15, i.e., it seals against the inside wall of the tube 1 more effectively and slides less easily. During pretensioning both piston members move together along the tube pulling the steel band and rotating the spool. After pretensioning the gas 18 dissipates and the piston moves back down the tube. The compression spring between the two piston members forces them apart and this moves the steel band back to the initial position where it is disengaged from the spool.

Figure 4:
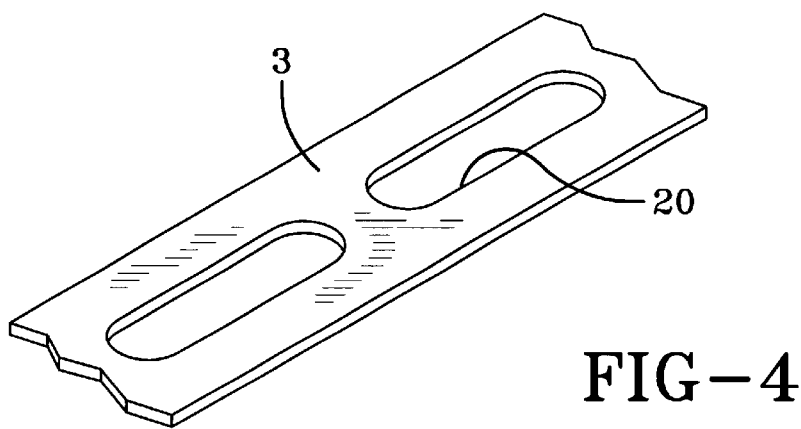
FIG. 4 is an enlarged perspective view of the steel band that is a component of the pretensioner of FIG. 1.
Figure 5:
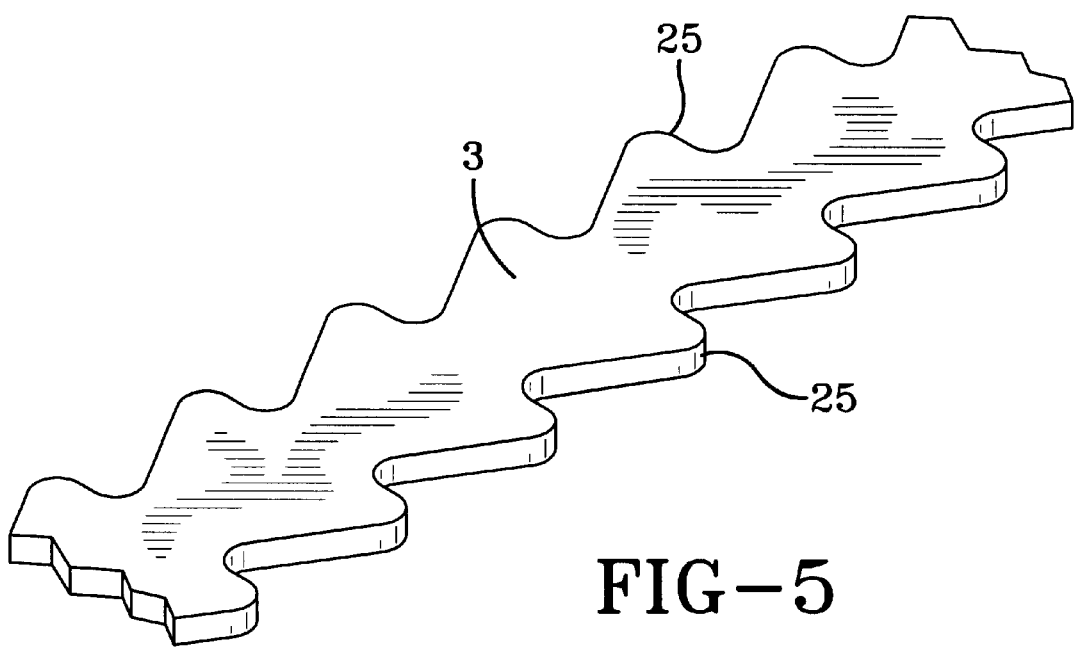
FIG. 5 is an enlarged perspective view of an alternative steel band that may be a component of the pretensioner of FIG. 1.

According to one embodiment, as shown in FIG. 4, the steel band 3 has indexing features, such as indexing holes or slots 20 punched or cut along at least a part of its length at intervals corresponding to the spacing of teeth 9 on an outer periphery of a drive wheel 8 that is attached to the retractor spool. As the steel band is pulled by the piston 2 it tightens around the drive wheel and the indexing holes engage the teeth, turning the drive wheel and the spool and pulling in the webbing to secure the vehicle occupant. FIG. 5 shows an alternative structure for the steel band 3 wherein the steel band has rows of teeth 25 along each longitudinal edge of the steel band to act as indexing features.

Preferably the steel band 3 is stored compactly as a coil 6 in a housing adjacent the tube. The steel band is routed around the inside perimeter wall of the housing, adjacent to, but distanced from the teeth on the drive wheel connected to the spool. The natural spring tendency of the steel band will tend to push it against the inner wall of the housing away from the teeth. Thus after pretensioning forces have dissipated the steel band will naturally spring back away from the drive wheel, releasing the spool to rotate freely again. This is in contrast to traditional pretensioners which tend to remain locked after pretensioning.

The pretensioner operates when a crash is sensed as a result of acceleration or deceleration exceeding a predetermined threshold. When the pretensioner fires, gas 18 fills the tube 1 between the seal 11 and the lower piston part 15, moving the piston assembly along the tube 1 as shown in FIG. 3 and at 22 in FIG. 1. Movement of the piston 2 to position 22 pulls the steel band 3 and tightens it around the drive wheel 21 as shown by the dotted line 23 in FIG. 1 tending to compress the spring 19 because the lower piston part 17 is a tighter fit in the tube 1 than the upper piston part 15. Subsequently the gas pressure is reduced and the piston assembly moves back towards the position shown in FIG. 2 under action of the resilience of the steel band 3 and the coil spring 19. The upper and lower piston parts are pushed apart by the spring 19 and the steel band 3 disengages from the drive wheel 8 allowing the spool to rotate freely again.

FIG. 4 is an enlarged perspective view of part of the steel band 3 showing spaced slots 20 which engage with the teeth 9 of the drive wheel 8. The teeth are advantageously saw tooth shapes as shown to facilitate release of the steel band after pretensioning. The steel band may typically be 10–15 mm wide.

The pretensioner of the invention provides an improved packaging capability since the steel band can be coiled very small. It also tends to have fewer parts and is cheaper to manufacture. Also, a lower power gas generator is needed than in some traditional pretensioners such as those known in the field as rack and pinion or ball type arrangements, because the energy required to move the steel band is relatively low.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. A seat belt pretensioner comprising: a piston; a tube housing the piston; a gas generator that is pyrotechnically activated when a crash is sensed to drive the piston along the tube; a resilient steel band connected to the piston; and a means for selectively connecting the steel band to a retractor spool, the gas generator has an output in the tube on one side of the piston to drive the piston along the tube to pull the steel band into engagement with the means for selectively connecting the steel band to the retractor spool, the piston comprising a first piston member connected to the steel band and a second piston member separated from the first member by a connecting assembly including a resilient member.

2. The seat belt pretensioner according to claim 1 wherein the means for selectively connecting the steel band to the retractor spool comprises at least one indexing feature in the steel band and a toothed drive wheel attached to the spool to engage the indexing feature.

3. The seat belt pretensioner according to claim 2 wherein the resilient member is a coil spring.

4. The seat belt pretensioner according to claim 2 wherein the second piston member fits more snugly in the tube than the second piston member.

5. The seat belt pretensioner according to claim 3 wherein the second piston member fits more snugly in the tube than the second piston member.

6. The seat belt pretensioner according to claim 2 wherein the steel band has a plurality of indexing features spaced along the steel band at intervals corresponding to the spacing of teeth on the toothed drive wheel.

7. The seat belt pretensioner according to claim 6 wherein the resilient member is a coil spring.

8. The seat belt pretensioner according to claim 7 wherein the second piston member fits more snugly in the tube than the second piston member.

9. The seat belt pretensioner according to claim 6 wherein the second piston member fits more snugly in the tube than the second piston member.

10. The seat belt pretensioner according to claim 6 wherein the steel band is stored as a coil in a housing.

11. The seat belt pretensioner according to claim 10 wherein the second piston member fits more snugly in the tube than the second piston member.

12. The seat belt pretensioner according to claim 10 further comprising a return spring located at or towards an end of the tube to push the piston back down the tube at the end of a pretensioning stroke.

13. The seat belt pretensioner according to claim 12 wherein the second piston member fits more snugly in the tube than the second piston member.

14. The seat belt pretensioner according to claim 1 wherein the steel band is stored as a coil in a housing.

15. The seat belt pretensioner according to claim 14 wherein the second piston member fits more snugly in the tube than the second piston member.

16. The seat belt pretensioner according to claim 1 further comprising a return spring located at or towards an end of the tube to push the piston each down the tube at the end of a pretensioning stroke.

17. The seat belt pretensioner according to claim 12 herein the second piston member fits more snugly in the tube than the second piston member.

18. The seat belt pretensioner according to claim 1 wherein the resilient member is a coil spring.

19. The seat belt pretensioner according to claim 18 wherein the second piston member fits more snugly in the tube than the second piston member.

20. The seat belt pretensioner according to claim 1 wherein the second piston member fits more snugly in the tube than the second piston member.

* * * * *